(12) United States Patent
Kim et al.

(10) Patent No.: US 7,851,231 B2
(45) Date of Patent: Dec. 14, 2010

(54) METHOD OF FABRICATING FIELD EMISSION ARRAY TYPE LIGHT EMITTING UNIT

(75) Inventors: Sun-il Kim, Yongin-si (KR); Jun-hee Choi, Yongin-si (KR); Byong-gwon Song, Yongin-si (KR); Shang-hyeun Park, Yongin-si (KR); Ho-suk Kang, Yongin-si (KR); Deuk-seok Chung, Yongin-si (KR); Chan-wook Baik, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/907,942

(22) Filed: Oct. 18, 2007

(65) Prior Publication Data

US 2008/0102547 A1 May 1, 2008

(30) Foreign Application Priority Data

Nov. 1, 2006 (KR) ...................... 10-2006-0107485

(51) Int. Cl.
  *H01L 21/00* (2006.01)
(52) U.S. Cl. .......................................................... 438/1
(58) Field of Classification Search ........................ None
  See application file for complete search history.

(56) References Cited

U.S. PATENT DOCUMENTS

| | | | |
|---|---|---|---|
| 2005/0258738 A1* | 11/2005 | Oh .............................. | 313/496 |
| 2006/0290288 A1* | 12/2006 | Choi et al. ................ | 315/169.1 |
| 2007/0114434 A1* | 5/2007 | Chang et al. ................. | 250/400 |
| 2007/0120459 A1* | 5/2007 | Yang et al. ................... | 313/495 |

FOREIGN PATENT DOCUMENTS

| | | |
|---|---|---|
| KR | 10-2003-0058212 | 7/2003 |
| KR | 10-2004-0044101 | 5/2004 |

* cited by examiner

*Primary Examiner*—Charles D Garber
*Assistant Examiner*—Andre' C Stevenson
(74) *Attorney, Agent, or Firm*—Cantor Colburn LLP

(57) ABSTRACT

A method of fabricating a field emission array type light emitting unit that includes a rear substrate including a plurality of cathodes and a plurality of carbon nanotube emitters on a front side, a front substrate including a plurality of anodes and a phosphor layer on a rear side, wherein the rear substrate and the front substrate are arranged at a distance apart from each other and a plurality of spacers are arranged between the rear substrate and the front substrate, the plurality of spacers being adapted to maintain constant the distance, the method includes producing a diffusion pattern by wet etching a front side of the front substrate.

16 Claims, 4 Drawing Sheets

METHOD OF FABRICATING FIELD EMISSION ARRAY TYPE LIGHT EMITTING UNIT

CLAIM OF PRIORITY

This application makes reference to, incorporates the same herein, and claims all benefits accruing under 35 U.S.C. §119 from an application for METHOD OF FABRICATING FIELD EMISSION ARRAY TYPE LIGHT EMITTING UNIT earlier filed in the Korean Intellectual Property Office on 1 Nov. 2006 and there duly assigned Serial No. 10-2006-0107485.

BACKGROUND OF THE INVENTION

1. Field of the Invention

The present invention relates to a method of fabricating a field emission array type light emitting unit, and more particularly, to a method of fabricating a diffusion pattern on a light exit face of a front substrate where an anode and a phosphor substance layer are formed.

2. Description of the Related Art

A backlight unit is disposed in a rear side of a liquid crystal display device and emits white light toward a liquid crystal display panel disposed in a front side of the liquid crystal display device. Conventionally, backlight units employing cold cathode fluorescent lamps (CCFLs) or light emitting devices (LEDs) as a light source have been largely used and a field emission array type backlight unit in a flat panel form have been suggested to provide slimmer devices.

When using a field emission array type light emitting unit employing a plurality of carbon nanotube emitters as an electron emission source, a variation in the strength of electron beams emitted from the plurality of carbon nanotubes emitters is likely to occur, and thus achieving uniform light emission from the entire area of the carbon nanotubes is technically challenging. To address this problem, a diffuser can be additionally disposed on a front side of a light emitting unit, which increases the thickness of a display device by as much as the thickness of the diffuser. In addition, in a field emission array type light emitting unit, both a portion which needs relatively more diffusion of light and a portion which needs relatively less diffusion of light exist, and adjusting the diffusion degree of a diffuser in an electron part to improve light emission uniformity results in greater loss of light. What is needed is a design and a method of making a display that provides for varying degrees of diffusion without excessive loss of light.

SUMMARY OF THE INVENTION

The present invention provides fabrication methods of diffusion structures incorporated in field emission array type light emitting units and fabrication methods of field emission array type light emitting units having light uniformity and light efficiency, the methods including forming light diffusion structures which vary the light diffusion degree depending on region on the front side of field emission array type light emitting units.

According to an aspect of the present invention, there is provided a method of fabricating a field emission array type light emitting unit comprising a rear substrate comprising a plurality of cathodes and a plurality of carbon nanotube emitters on a front side, a front substrate comprising a plurality of anodes and a phosphor layer on a rear side, wherein the rear substrate and the front substrate are disposed at a predetermined distance from each other and a plurality of spacers are provided between the rear substrate and the front substrate to maintain constant the predetermined distance, wherein a diffusion pattern is formed on a front side of the front substrate by wet etching.

The wet etching can be performed for a period of time depending on a desired light diffusion degree. The period of time for performing the wet etching can be from 10 minutes through 1 hour.

The front side of the front substrate can be divided into at least two regions and diffusion patterns having different light diffusion degrees can be formed by varying the etching time for each of the regions. For example, a diffusion pattern having a relatively low diffusion degree can be formed by primarily etching the front side of the front substrate. Then, a mask pattern can be formed on the primarily etched front side of the front substrate so that only a portion thereof is exposed. Subsequently, a diffusion pattern having a relatively high diffusion degree can be formed by secondarily etching the exposed portion.

A region where the diffusion pattern having a relatively high diffusion degree is formed can comprise a region corresponding to areas where the spacers are disposed when the front substrate and rear substrate are assembled.

The term "front side" refers to the side to which light is emitted, and "rear side" refers to the reverse side.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
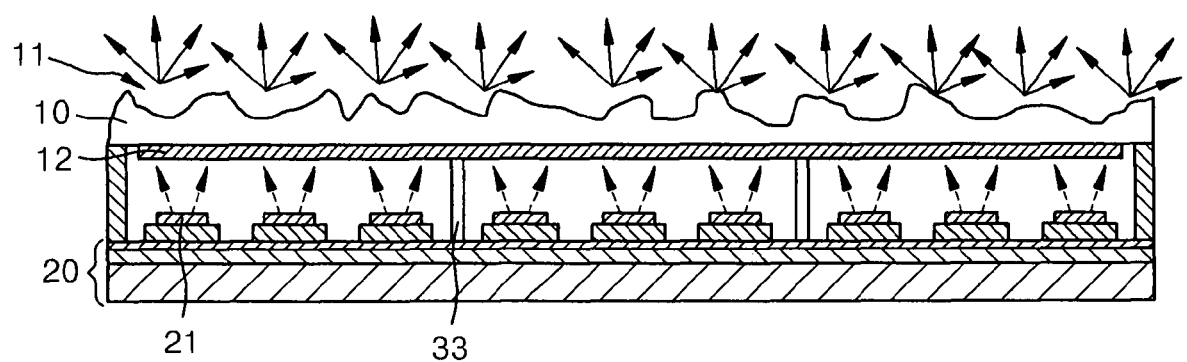
FIG. 1 is a sectional view of a field emission array type light emitting unit fabricated according to an embodiment of the present invention.

The present invention will now be described more fully with reference to the accompanying drawings, in which exemplary embodiments of the invention are shown. The thickness of layers or areas of regions illustrated in the drawings may be exaggerated for a better understanding of the present invention.

FIG. 1 illustrates a field emission array type light emitting unit fabricated according to an embodiment of the present invention. The field emission array type light emitting unit includes a front substrate 10 and a rear substrate 20 disposed at a predetermined distance apart from the front substrate 10. A plurality of cathodes (not shown) and a plurality of emitters 21, which emit electric currents supplied from the cathodes, are disposed on the rear substrate 20. The cathodes are disposed in a plurality of stripes on a front side of the rear substrate 20, and the emitters 21 can be disposed on the cathodes. The emitters 21 can include carbon nanotubes as an electron emission tip. A plurality of anodes (not shown) and a phosphor layer 12 are disposed on a rear side of the front substrate 10.

FIG. 1 is a simplified view of a constitution for electron emission and light emitting caused by the emitted electron beam between the rear substrate 20 and the front substrate 10. The constitution can include any conventional known constitution including a diode or triode structures for field emission. Electron beams emitted from the emitters 21 pass through a space between the rear substrate 20 and the front substrate 10 while being affected by an electric field, and after reaching the anodes (not shown) disposed on the rear side of front substrate 10, excite the phosphor layer 12 on the surface of anode so that visible light is emitted therefrom. The emitted visible light passes through the front substrate 10 and is projected outside through the front side of the front substrate 10. A plurality of spacers 33 can be disposed between the front substrate 10 and the rear substrate 20 to maintain the predetermined distance between the front substrate 10 and rear substrate 20. The front substrate 10 may be formed of a transparent material such as glass. The anodes disposed between the phosphor layer 12 and front substrate 10 may be transparent electrodes through which visible light can pass, such as indium tin oxide (ITO) electrode.

The emitters 21, which include carbon nanotubes, are advantageous in terms of electron emission efficiency and endurance. However, a variation in an electric current emitted from the emitters 21 can occur due to minute manufacturing tolerances generated when manufacturing the rear substrate 20. Therefore, a method of fabricating the field emission array type light emitting unit of the present invention includes the following processes to make uniform the emission of light throughout the entire face of the front substrate 10.

A diffusion pattern 11 is integrally formed in the front side of the front substrate 10 to diffuse exiting light. The diffusion pattern 11 can be formed by wet etching. The wet etching can be performed prior to forming the anodes and the phosphor layer pattern on the rear side of the front substrate 10, however, the present invention is not limited thereto. Hereinafter, the wet etching process for forming the diffusion pattern 11 is described more fully with reference to FIG. 2.

In fabricating the field emission array type light emitting unit according to the present invention, the rear substrate 20 can be manufactured by conventional processes such as a thin film forming, patterning processes and carbon nanotube growth processes, etc. Forming of the rear constituents of the front substrate 10 and assembling of the front substrate 10 to the rear substrate 20 also can be performed by conventional processes.

Figure 2:
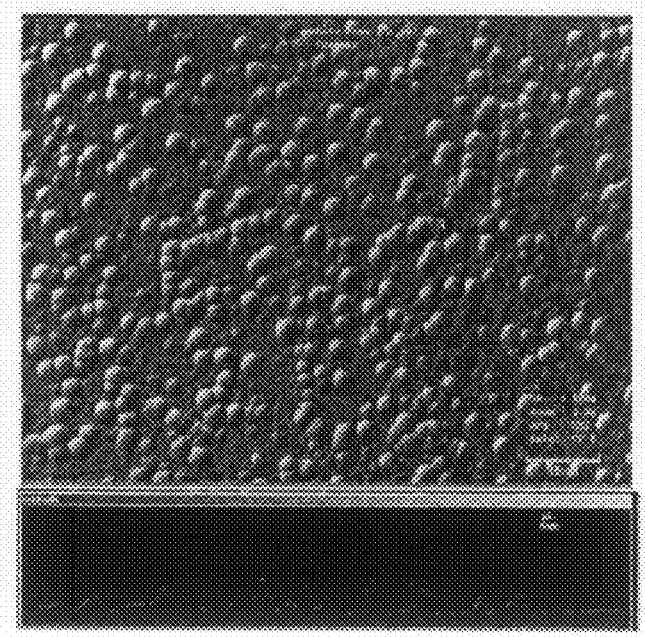
FIG. 2 is an enlarged image showing a diffusion pattern formed according to an embodiment of the present invention.

FIG. 2 is an enlarged image of a diffusion pattern formed according to an embodiment of the present invention. For example, a glass material that makes up the front substrate 10 is steeped with a buffered oxide etchant (BOE) to form the diffusion pattern 11 on the front side thereof. The BOE, which is a mixture solution of $NH_4F$ and HF, is an etchant used mainly for etching $SiO_2$. HF solution directly relates to etching oxides and $NH_4F$ solution is a buffer and relates to uniformity of etching by controlling the etch rate. In the current embodiment, the BOE has a mixing ratio of 6:1. As a result, the diffusion pattern 11, having minute protrusions, is formed on the front substrate 10 as illustrated in FIG. 2. The degree of light diffusion through the diffusion pattern 11 can be controlled by controlling the etching time. In the case of FIG. 2, the etching process for forming the diffusion pattern 11 takes approximately 30 minutes and the etching rate is approximately 0.27 µm/min.

In order to form a diffusion pattern 11 having minute protrusions of approximately 3 to 10 µm, the etching process can take approximately 10 minutes to 1 hour. As the etching time increases, the length of the protrusions in the diffusion pattern 11 increase, thereby increasing the degree of light diffusion. However, the light dispersing property of a diffusion pattern is insignificant when the etching time is shorter than 10 minutes, while loss of light due to dispersion becomes excessive when the etching time is longer than 1 hour.

Figure 3:
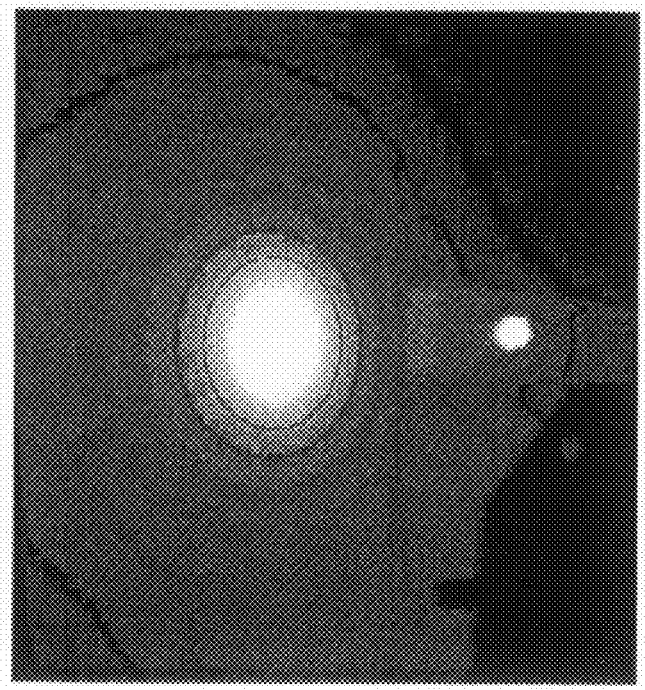
FIG. 3 shows an image when a helium-neon laser beam is diffused using the diffusion pattern of FIG. 2.

FIG. 3 is a photographic image showing a shape of a He—Ne laser beam diffused by the diffusion pattern of FIG. 2. The small point in the right side of the image represents the laser beam not diffused by the diffusion pattern, and the large light region in the center of image represents the laser beam diffused by the diffusion pattern.

Figure 4:
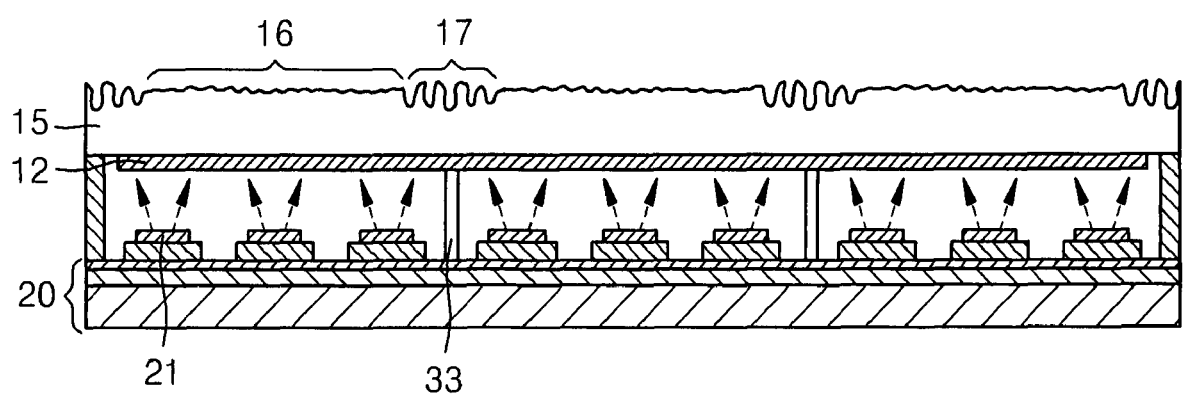
FIG. 4 is a sectional view illustrating a field emission array type light emitting unit fabricated according to another embodiment of the present invention.

FIG. 4 illustrates a field emission array type light emitting unit fabricated according to another embodiment of the present invention. A diffusion pattern can be partially formed on a front substrate, or can be formed so as to have different diffusion degrees depending on a forming region. The field emission array type light emitting unit of FIG. 4 has diffusion pattern 16 and 17 which are formed so as to have different light diffusion degrees depending on the forming regions on a front side of a front substrate 15. For example, the diffusion pattern 17, of which light diffusion degree is relatively high, can be formed on regions of the front substrate 15 that correspond to the regions where spacers 33 are disposed between the front substrate 15 and a rear substrate 20. This is because a region where emitters 21 are disposed under the front substrate 15 requires a relatively low degree of light diffusion, whereas a region where the spacers 33 are disposed under the front substrate 15 requires a relatively high degree of light diffusion in order to obtain a uniform emission of light throughout the entire area of the front substrate 15.

A method of fabricating the front substrate 15 including the diffusion patterns 16 and 17 is as follows. First, wet etching is performed on the entire face of the front substrate 15, on which a mask pattern which exposes only the region requiring a relatively high degree of light diffusion, is formed. The mask pattern can be formed, for example, by forming a photoresist film and exposing the photoresist film to light and developing it. However, the present invention is not limited thereto, and any mask pattern which allows wet etching to progress only in the exposed regions through the mask pattern can be used. Then, the wet etching is performed again. The sizes of the protrusions in the corresponding region of the front substrate 15 vary with the etching time and thus the degree of light diffusion varies accordingly. Therefore, uniform light is emitted from the entire area of the field emission array type light emitting unit, and light loss due to excessive diffusion can be minimized.

Figure 5:
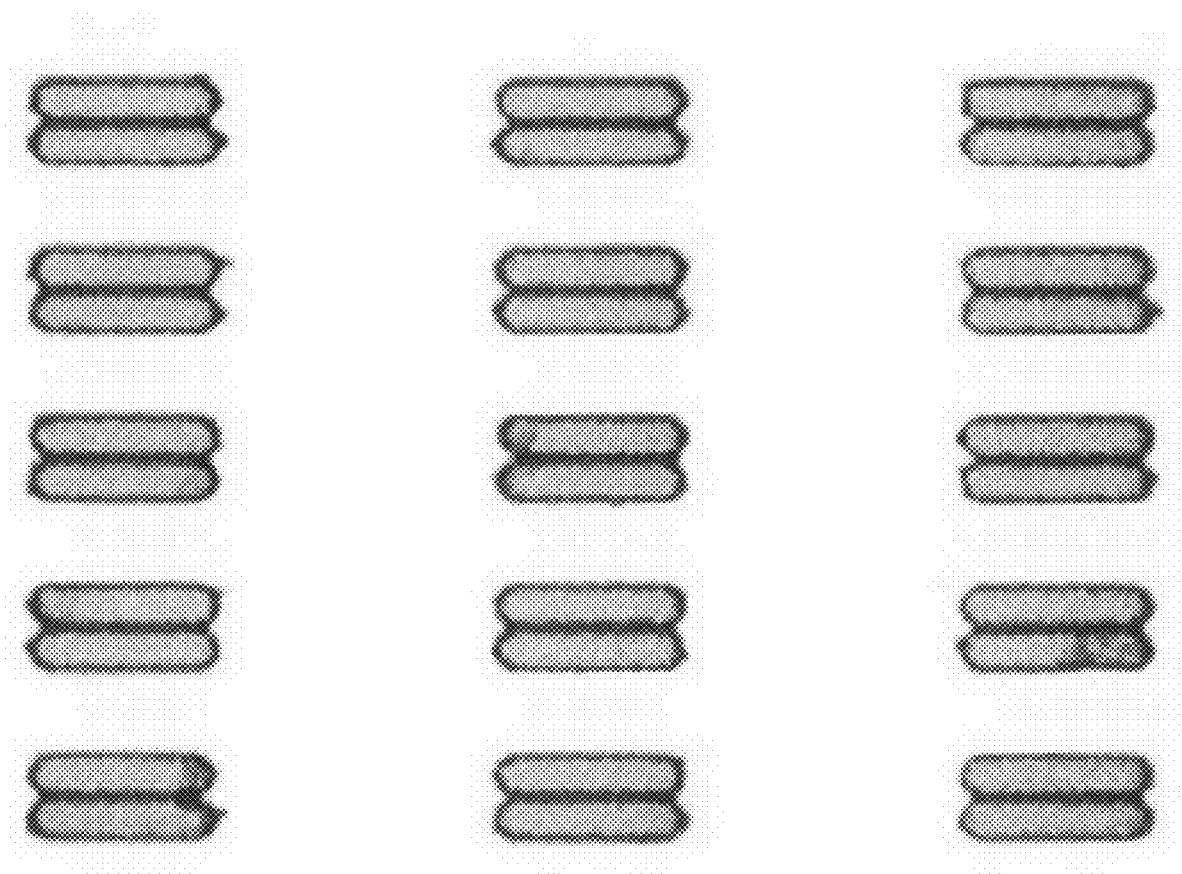
FIG. 5 is an enlarged image illustrating diffusion patterns formed partially on a glass substrate according to an embodiment of the present invention.

FIG. 5 is an enlarged image illustrating diffusion patterns formed on a portion of glass substrate according to an embodiment of the present invention. By performing wet etching after forming a mask pattern on the glass substrate, the diffusion patterns are formed only in exposed regions through the mask. As illustrated in FIG. 4, the diffusion patterns can be formed on the entire area of the glass front substrate 15, and the diffusion degree vary with each region by changing the etching time.

While the present invention has been particularly shown and described with reference to exemplary embodiments thereof, it will be understood by those of ordinary skill in the art that various changes in form and details maybe made therein without departing from the spirit and scope of the present invention as defined by the following claims.

What is claimed is:

1. A method of fabricating a field emission array type light emitting unit, the method comprising:

providing a rear substrate including a plurality of cathodes and a plurality of carbon nanotube emitters on a front side, a front substrate including a plurality of anodes and a phosphor layer on a rear side, wherein a plurality of spacers are arranged between the front substrate and the rear substrate, the plurality of spacers adapted to keep the front substrate spaced apart from the rear substrate by a distance; and producing a diffusion pattern by wet etching a front side of the front substrate, wherein the diffusion pattern diffuses light from a phosphor layer.

2. The method of claim 1, wherein the wet etching is performed for a period of time that depends upon a desired light diffusion degree.

3. The method of claim 2, wherein the period of time for performing the wet etching is in the range of 10 minutes to 1 hour.

4. The method of claim 1, wherein the front side of the front substrate is divided into at least two regions and a plurality of diffusion patterns having different light diffusion degrees are produced in each of the at least two regions by varying a period of time for etching.

5. The method of claim 4, wherein the producing the diffusion pattern comprises:

forming a diffusion pattern having a relatively low diffusion degree by primarily etching the front side of the front substrate;

forming a mask pattern on the primarily etched front side of the front substrate that exposes only a portion thereof; and forming a diffusion pattern having a relatively high diffusion degree by secondarily etching the exposed portion.

6. The method of claim 5, wherein a region on the front substrate having the diffusion pattern of a relatively high diffusion degree corresponds to portions of the front substrate directly above ones of the plurality of spacers.

7. The method of claim 5, wherein a mask pattern is formed on the front substrate to expose only a portion thereof, and the exposed portion is etched to form a diffusion pattern.

8. The method of claim 1, wherein the front substrate is comprised of glass.

9. The method of claim 1, the wet etching being performed by an etchant comprising $NH_4F$ and $HF$.

10. A method, comprising:

providing a front substrate spaced apart from a rear substrate by a plurality of spacers;

performing a first wet etch on an entire front surface of the front substrate for a first period of time to form a diffusion pattern having as first degree of light diffusion;

applying and patterning a photoresist pattern to the front surface of the front substrate after said first wet etch; and performing a second wet etch for a second and longer period of time only on portions of the front surface of the front substrate that are exposed by said photoresist pattern to form a diffusion pattern having a second degree of light diffusion, wherein the first degree of light diffusion degree is less than the second degree of light diffusion.

11. The method of claim 10, wherein portions of the front surface of the front substrate exposed by said photoresist pattern corresponding to portions of the front substrate that correspond to ones of the plurality of spacers.

12. The method of claim 10, each of the first and the second wet etch being achieved by an etchant comprising $NH_4F$ and $HF$.

13. The method of claim 10, wherein a light-emitting material is arranged between the front and the rear substrates and between ones of the plurality of spacers.

14. A field emission array type light emitting unit, comprising:

a front substrate;

a rear substrate disposed a selected distance apart from the front substrate;

a plurality of cathodes disposed on a front side of the rear substrate, which is adjacent to the front substrate;

a plurality of emitters disposed on the cathodes;

a plurality of anodes disposed on a rear side of the front substrate, which is adjacent to the rear substrate;

a plurality of spacers arranged between the front substrate and the rear substrate; and a phosphor layer disposed on the anodes, wherein the front substrate includes first and second diffusion patterns, which have different degrees of light diffusion, on the front side of the front substrate, and the plurality of spacers are adapted to keep the front substrate spaced apart from the rear substrate by the selective distance.

15. The field emission array type light emitting unit of claim 14, wherein a degree of light diffusion of the first diffusion pattern is greater than a degree of light diffusion of the second diffusion pattern.

16. The field emission array type light emitting unit of claim 15, wherein the first diffusion pattern is disposed on regions corresponding to regions on the front substrate where the spacers are disposed.

* * * * *